(12) United States Patent
Sarwono et al.

(10) Patent No.: US 7,506,143 B2
(45) Date of Patent: Mar. 17, 2009

(54) DISTRIBUTED MONITORING OF DESIRED CONFIGURATIONS USING RULES

(75) Inventors: Edhi Sarwono, Redmond, WA (US); Frank J. Zakrajsek, Carnation, WA (US); Gregory P. Gicewicz, Fall City, WA (US); Roberta McAlpine, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 421 days.

(21) Appl. No.: 11/274,049

(22) Filed: Nov. 15, 2005

(65) Prior Publication Data

US 2007/0168493 A1    Jul. 19, 2007

(51) Int. Cl.
*G06F 9/00* (2006.01)
(52) U.S. Cl. .................. 713/1; 713/2; 713/100
(58) Field of Classification Search ........... 713/1, 713/2, 100
See application file for complete search history.

(56) References Cited

U.S. PATENT DOCUMENTS

| | | | |
|---|---|---|---|
| 5,109,486 A | 4/1992 | Seymour | |
| 5,893,083 A | 4/1999 | Eshghi et al. | |
| 6,282,175 B1 | 8/2001 | Steele et al. | |
| 6,880,107 B1 | 4/2005 | Kraft, IV | |
| 2003/0055948 A1 | 3/2003 | Wang | |
| 2003/0177412 A1 | 9/2003 | Todd | |
| 2003/0204789 A1 | 10/2003 | Peebles et al. | |
| 2003/0233649 A1 | 12/2003 | Reimert | |
| 2004/0019894 A1 | 1/2004 | Willard et al. | |
| 2004/0059920 A1* | 3/2004 | Godwin ............... 713/183 |
| 2004/0088405 A1 | 5/2004 | Aggarwal | |
| 2005/0097346 A1* | 5/2005 | Pipal et al. ............ 713/200 |
| 2005/0132346 A1 | 6/2005 | Tsantilis | |
| 2005/0138164 A1 | 6/2005 | Burton et al. | |
| 2008/0055100 A1* | 3/2008 | Mathur et al. ............ 340/679 |

FOREIGN PATENT DOCUMENTS

| | | |
|---|---|---|
| EP | 1569107 A2 | 8/2005 |
| GB | 2327782 A | 2/1999 |

OTHER PUBLICATIONS

U.S. Appl. No. 11/274,898, filed Nov. 15, 2005, Sarwono et al.
Tierney, Brian, Brian Crowley, Dan Gunter, Jason Lee and Mary Thompson, "A Monitoring Sensor Management System for Grid Environments," Cluster Computing, ISSN: 1386-7857, vol. 4, No. 1, pp. 19-28, Mar. 2001, Springer Science+Business Media B.V., 8 pages.

(Continued)

*Primary Examiner*—Thomas Lee
*Assistant Examiner*—Vincent T Tran
(74) *Attorney, Agent, or Firm*—Perkins Coie LLP

(57) ABSTRACT

A method and system for monitoring configuration information of computing devices is provided. The monitoring system generates a desired configuration monitor ("DCM") document for each computing device that is to have its configuration monitored. The DCM document specifies configuration settings to be monitored along with rules that specify how to determine whether a configuration setting is correct. Each computing device may include a comparison engine that inputs the DCM document and applies the rules of the DCM document to determine which configuration settings of the computing device are not in compliance.

17 Claims, 14 Drawing Sheets

OTHER PUBLICATIONS

Van Renesse, Robbert, Kenneth P. Birman and Werner Vogels, "Astrolabe: A Robust and Scalable Technology For Distributed System Monitoring, Management, and Data Mining," 2003 ACM, 43 pages http://www.cs.cornell.edu/ken/Astrolabe.pdf.

Clark, James and Steve DeRose, "XML Path Language (XPath) Version 1.0," W3C Recommendation, Nov. 16, 1999, W3C 1999, 31 pages, http://www.w3.org/TR/1999/REC-xpath-19991116.html [Accessed Oct. 5, 2005].

* cited by examiner

DISTRIBUTED MONITORING OF DESIRED CONFIGURATIONS USING RULES

BACKGROUND

An ever-increasing number of applications (i.e., computer software) with various features are available to users of computers. Users can tailor the operation of these applications to suit their needs by specifying various configuration parameters. For example, a browser application may have a configuration parameter that provides a URL of a web page that is displayed initially whenever the browser application starts (i.e., "a home page"). The browser application may also have configuration parameters that identify programs to be invoked to process certain types of content (e.g., a "jpeg" file) and that specify passwords to be used when the application connects to various servers. The values of the configuration parameters can be stored in application-specific configuration files such as UNIX resource files or in a central registry such as the Windows® registry files. The application-specific configuration file for an application may have an internal format that is specific to that application. With a central registry, many different applications can share the same configuration parameters. The applications access these files to retrieve the values of their configuration parameters.

If certain configuration parameters have incorrect values, then the applications may exhibit an undesired behavior. For example, if the value of a home page configuration parameter is not set correctly, then when the browser application starts, it will exhibit an undesired behavior by not displaying a home page or displaying the wrong home page. If a configuration parameter incorrectly indicates a certain text editor should be invoked to process a graphics file, then the undesired behavior will be the incorrect display of the graphics content.

The configuration of a computer system may also refer to the files that are installed on that computer system. For example, when an application is installed on a computer system, the application may install various auxiliary files, such as dynamic link libraries, that are needed for proper operation of that application. If one of the auxiliary files is modified or removed from the computer system, then the application may not operate properly. The removing or replacing of auxiliary files is especially problematic when a later-installed application uses a different version of an auxiliary file. When the later-installed application is installed, it may replace the version of an auxiliary file used by an earlier-installed application, which may cause of the earlier-installed application to operate incorrectly.

The use of the correct configuration is particularly important to servers that provide services to many client computers. If a server has an incorrect configuration, then the server may not be able to provide its service to its clients, which may number in the hundreds. The inability of the clients to use the services of the server may also result in the failure of those clients. Thus, an incorrect configuration may not only cause a server to fail but may also cause each of the clients that depend on that server to fail.

Because of the complexity of applications and their large number of configuration settings (e.g., configuration parameters and auxiliary files), it can be very time-consuming to troubleshoot which configuration settings are at fault for causing an application to exhibit the undesired behavior. Most users of computers, including information technology personnel, have difficulty performing this troubleshooting. As a result, users typically rely on very experienced technical support personnel to assist in the troubleshooting. This troubleshooting not only is expensive but also users may experience a significant productivity loss as a result of their inability to effectively use an application that is exhibiting an undesired behavior, especially when the application is executed by a server and the users of its clients cannot use the application.

Typically, technical support personnel use an ad hoc approach to troubleshooting configuration problems. Because some central registries store over 200,000 configuration parameters and some applications rely on hundreds of auxiliary files, the personnel using knowledge gained from experiencing similar problems will try to narrow in on the at-fault configuration setting. This ad hoc approach can take a considerable amount of time and even longer if it is a combination of configuration settings that is incorrect.

SUMMARY

A method and system for monitoring configuration information of computing devices is provided. The monitoring system is provided with a desired configuration monitor ("DCM") document for each computing device that is to have its configuration monitored. The DCM document specifies configuration settings to be monitored along with rules that specify how to determine whether a configuration setting is correct. The monitoring system executing on a monitoring server then distributes the DCM document to each computing device that is to have its configuration monitored. Each computing device may include a comparison engine that inputs the DCM document and applies the rules of the DCM document to determine which configuration settings of the computing device are not in compliance. The comparison engine may generate a log of the configuration settings that are not in compliance. The computing device may also include a reporting engine that uploads the log of the configuration settings that are not in compliance to a monitoring server. The monitoring server may collect the logs from multiple computing devices and provide reports to assist the administrator in analyzing the configuration settings of the computing devices.

The monitoring system may also provide a user interface through which the user can specify configuration settings that are to be monitored along with rules that define when a configuration setting is in compliance or not in compliance. The user interface provides a hierarchical organization of configuration settings through which a user can define arbitrary groups of configuration settings. Within a group, the configuration settings may be organized based on the data source of the configuration settings. The user interface allows a user to define a group, data sources within the group, and configuration settings within each data source. Thus, the groups, data sources, and configuration settings form a hierarchical organization of configuration settings. Each configuration setting has a rule that defines when the configuration setting is in compliance. The monitoring system may allow a user to specify an action to take when a configuration setting is identified as being not in compliance.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
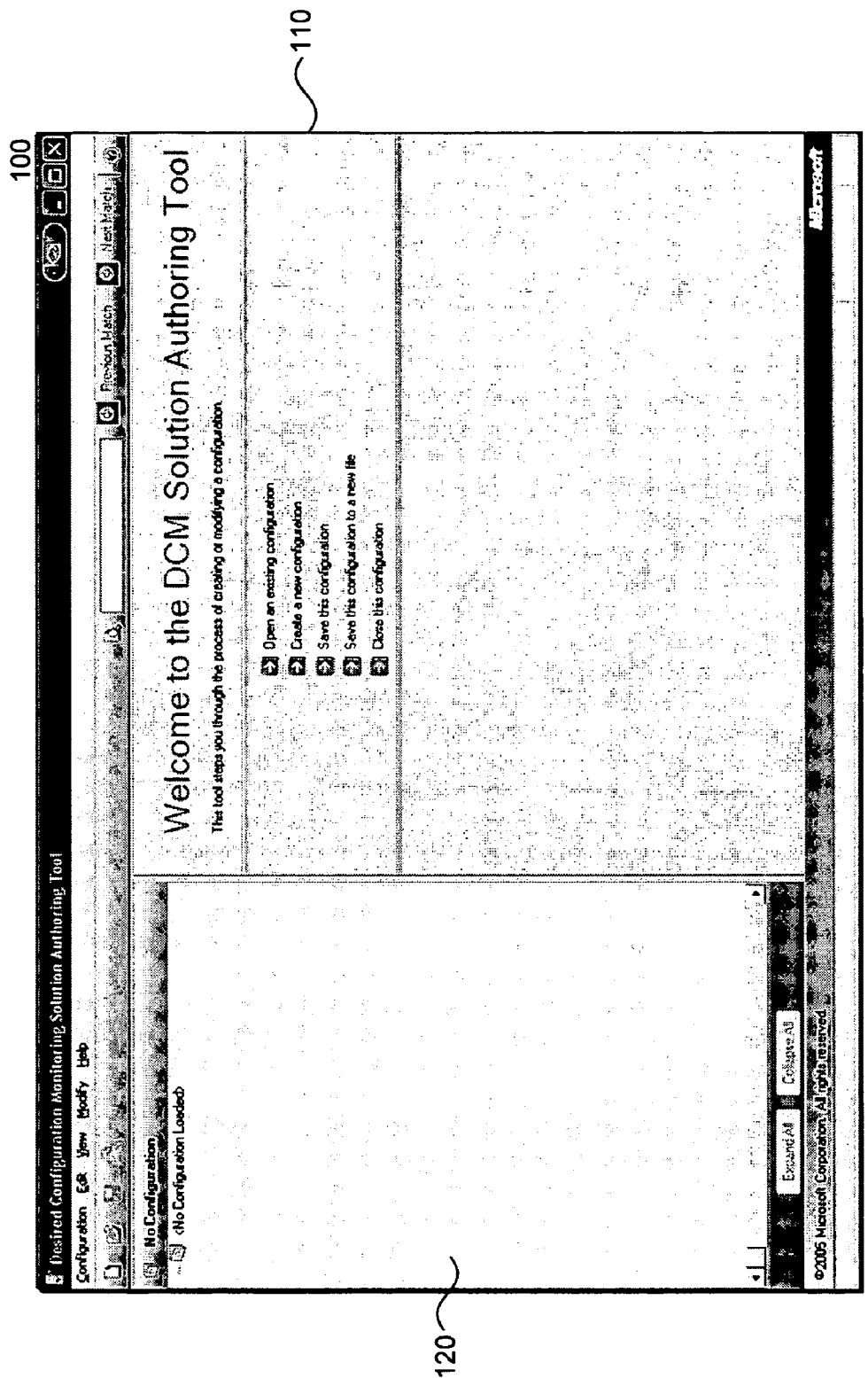
FIG. 1 illustrates a display page of the user interface for creating a DCM document in one embodiment.

A method and system for monitoring configuration information of computing devices is provided. In one embodiment, the monitoring system is provided with a desired configuration monitor ("DCM") document for each computing device that is to have its configuration monitored. The DCM document specifies configuration settings to be monitored along with rules that specify how to determine whether a configuration setting is correct, or more generally, whether a configuration setting is in compliance with a desired configuration value. For example, the configuration settings may include configuration parameters stored in a system registry, and each rule may identify a value or range of values that are correct for the corresponding configuration parameter. As another example, the configuration settings may specify auxiliary files, and the rule for an auxiliary file may specify the creation date or file size of the correct auxiliary file. The monitoring system may provide a user interface through which an administrator can specify the configuration settings to be monitored. The monitoring system executing on a monitoring server then distributes the DCM document to each computing device that is to have its configuration monitored. Each computing device may include a comparison engine that inputs the DCM document and applies the rules of the DCM document to determine which configuration settings of the computing device are not in compliance. The comparison engine may generate a log of the configuration settings that are not in compliance. The comparison engine may be run on an ad hoc basis or may be scheduled to run periodically. The computing device may also include a collection engine that uploads the log of the configuration settings that are not in compliance to a monitoring server. The monitoring server may collect the logs from multiple computing devices and provide reports to assist the administrator in analyzing the configuration settings of the computing devices. In this way, the monitoring system can automatically detect when configuration settings are not in compliance and administrators can take appropriate action to place the configuration settings in compliance.

In one embodiment, the monitoring system provides a user interface through which the user can specify configuration settings that are to be monitored along with rules that define when a configuration setting is in compliance or not in compliance. The user interface provides a hierarchical organization of configuration settings through which a user can define arbitrary groups of configuration settings. For example, a user may want to monitor configuration settings for multiple applications. In such a case, the user may define a group of configuration settings for each application. Within a group, the configuration settings may be organized based on the data source of the configuration settings. In a computing device that operates under the Windows operating system, the data sources may include the registry file, the active directory ("AD") database, the Windows Management Instrumentation ("WMI") store, the files of the file system, and so on. Thus, the user interface allows a user to define a group, data sources within the group, and configuration settings within each data source. Thus, the groups, data sources, and configuration settings form a hierarchical organization of configuration settings. Each configuration setting has a rule that defines when the configuration setting is in compliance. Such a rule is referred to as an active rule. An active rule evaluates to a Boolean value indicating whether the configuration setting is in compliance. An active rule may reference passive rules that specify how to create values (e.g., Boolean values or data values) that are used by an active rule. By combining passive rules into an active rule, the user interface can be used to define rules of arbitrary complexity. In addition, the user interface may allow a user to specify a rule using the syntax of the XPath language. The user interface stores the desired configuration monitor document in an XML format that is similar to that described in U.S. patent application Ser. No. 11/064,687, entitled "System and Method for Retrieving and Analyzing Data from a Variety of Different Sources," filed on Feb. 24, 2005, which is hereby incorporated by reference.

In one embodiment, the user interface may interface with a configuration system or a configuration store to assist the user in defining the rules for the configuration settings. The configuration system may store desired values, also referred to as "golden" values, for each of the configuration settings of the computing devices. When a user wants to monitor a certain configuration setting, the user interface may access the configuration system to retrieve the desired value for the configuration setting and provide that desired value to the user for use in the generating a rule. The configuration system may also identify a desired value based on analysis of the configuration settings of various computing devices. Such identification of desired values is described in U.S. patent application Ser. No. 10/918,786, entitled "Method and System for Troubleshooting a Misconfiguration of a Computer System based on Configurations of other Computer Systems," and filed on Aug. 13, 2004, which is hereby incorporated by reference. Alternatively, the monitoring system may automatically create rules based on the desired values of the configuration system for the configuration settings that a user indicates should be monitored.

In one embodiment, the monitoring system may allow a user to specify an action to take when a configuration setting is identified as being not in compliance. For example, the user may specify to replace the value of the configuration setting that is not in compliance with a desired value. As another example, the user may specify to prevent the application whose configuration setting is not in compliance from executing or to abort the execution of any such application. The monitoring system may allow the user to specify the action by defining a computer code (e.g., a dynamic link library or an executable file) for performing the desired action.

In one embodiment, the monitoring system may have a server component that executes on a system monitoring server and a client component that executes on a computing device to be monitored. Although the computing device on which the client component executes may be referred to as a client for configuration monitoring purposes, the computing device may itself be a server (i.e., a monitored server) such as a file server, an electronic mail server, a database server, a web server, and so on. The server component may include a user interface component, a distribution component, and a reporting component, and a DCM document store. The user interface component allows the user to create and modify DCM documents as described above. The distribution component is responsible for distributing the DCM documents to the computing devices to be monitored. The distribution component may create a distribution package that includes the client component and DCM documents. The distribution component then distributes the packages to the computing devices to be monitored. When a computing device receives the package, it installs the client component and stores the DCM document. The client component may include a comparison engine and a collection engine. During installation, the execution of the comparison engine and collection engine may be scheduled to occur at various intervals. When the comparison engine executes, it applies the rules of the DCM document to identify the configuration settings that are not in compliance. When a configuration setting is not in compliance, the comparison engine logs an indication that the configuration setting is not in compliance. When the collection engine executes, it uploads the log of the configuration settings that are not in compliance to the monitoring server. The reporting component of the server component provides reporting tools so that a user can analyze the configuration settings that are not in compliance. In one embodiment, a configuration package also includes the computer code for performing the actions defined by the rules.

FIG. 1 illustrates a display page of the user interface for creating a DCM document in one embodiment. Display page 100 includes a main panel 110 and a hierarchical display panel 120. The main panel displays various options and data entry fields. In this example, the main panel displays the option to open an existing DCM document (e.g., configuration) or to create a new DCM document. The hierarchical display panel displays the hierarchy of groups, data sources, configuration settings and rules of the currently open document.

Figure 2:
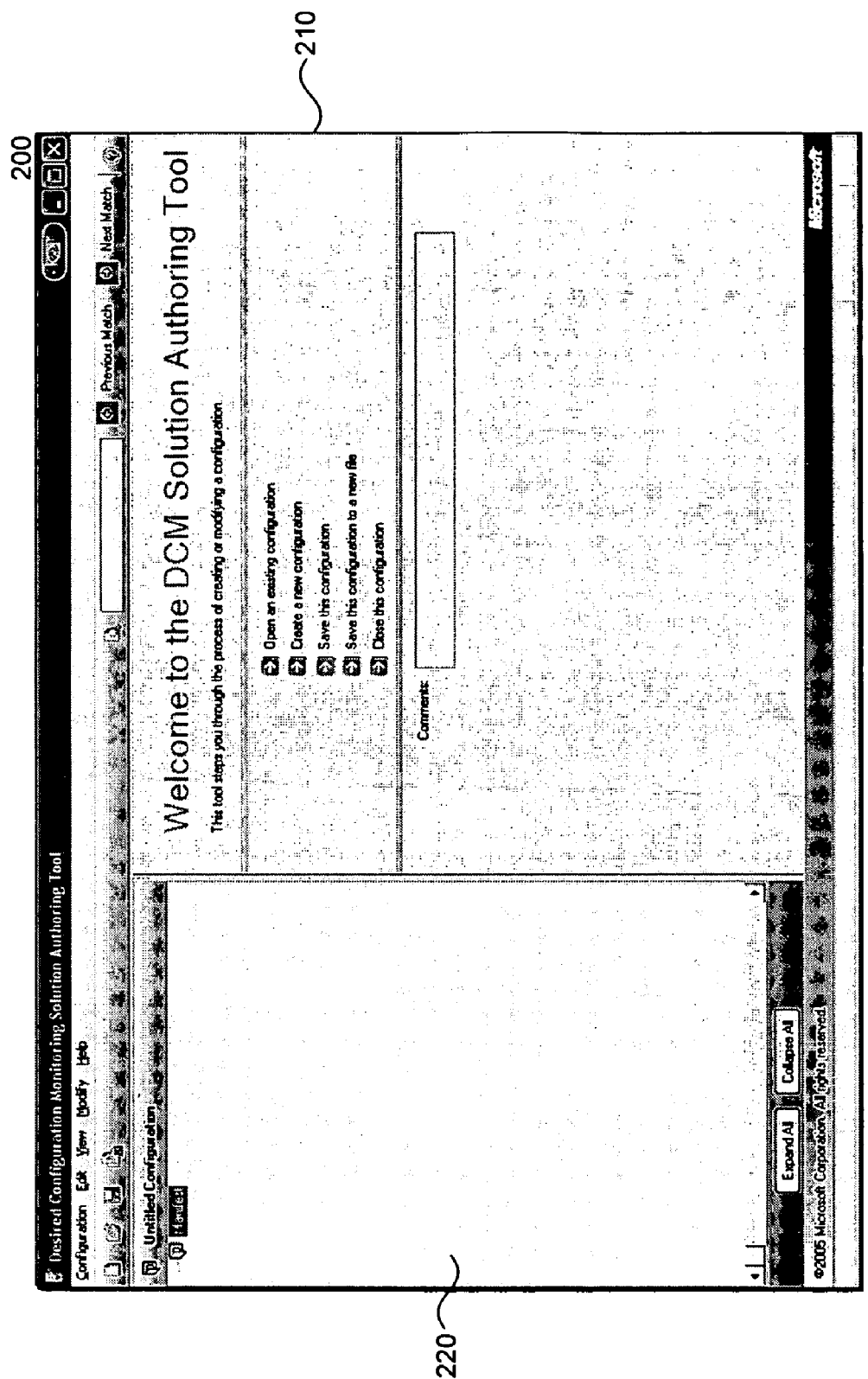
FIG. 2 illustrates a display page of the user interface after a user has indicated to create a DCM document in one embodiment.

FIG. 2 illustrates a display page of the user interface after a user has indicated to create a DCM document in one embodiment. Display page 200 includes a main panel 210 and a hierarchical display panel 220. The main panel indicates that the user selected to create a new DCM document. As a result, the user interface has provided the now available options to save and close the configuration document. The hierarchical display panel contains an indication of the root of the configuration setting hierarchy with the name "Manifest." Since the DCM document is newly created, the root contains no child information.

Figure 3:
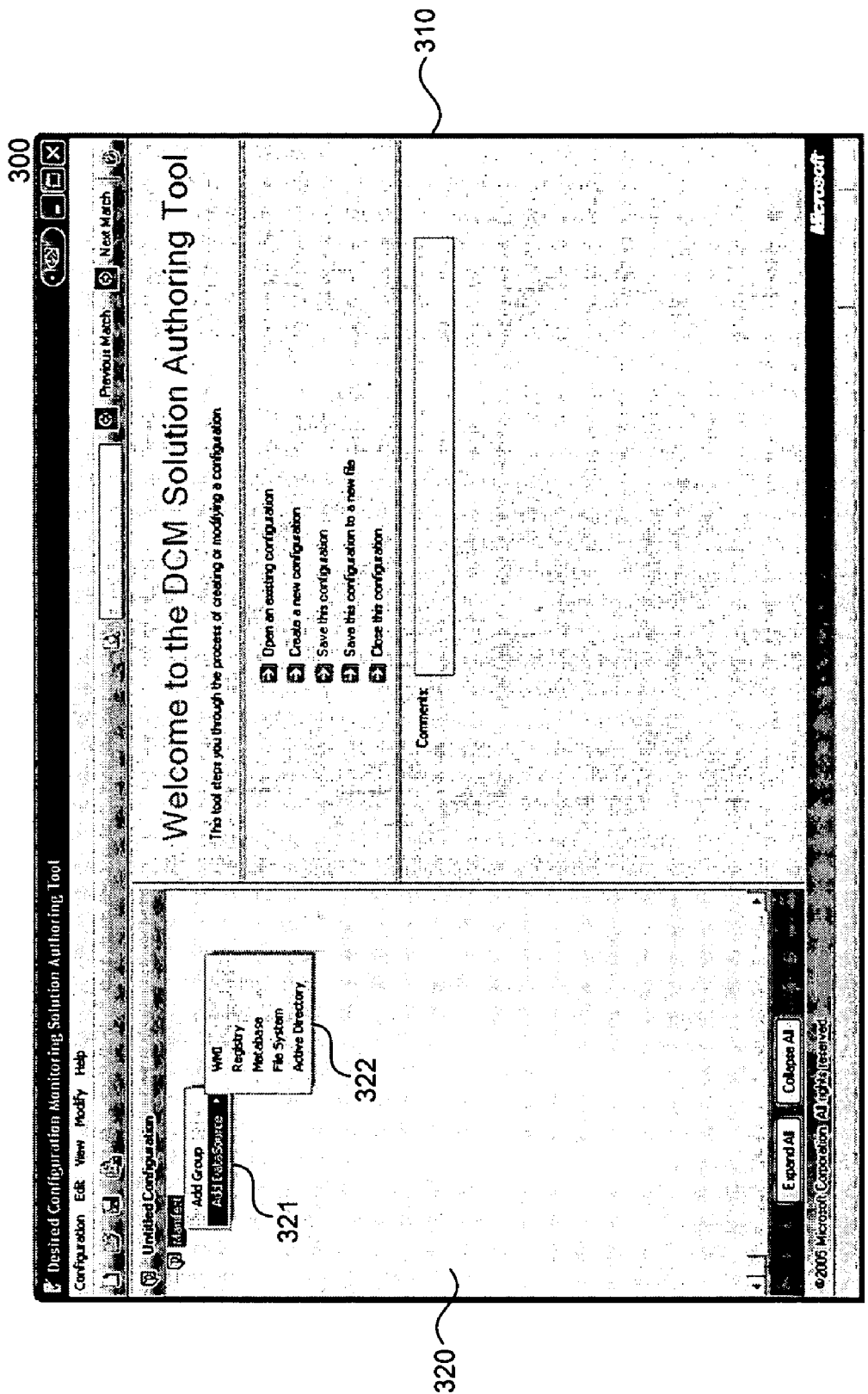
FIG. 3 illustrates a display page of the user interface after a user has selected the root of the configuration setting hierarchy in one embodiment.

FIG. 3 illustrates a display page of the user interface after a user has selected the root of the configuration setting hierarchy in one embodiment. Display page 300 includes a main panel 310 and a hierarchical display panel 320. When the user right clicked on the root within the hierarchical display panel, the user interface displayed a list 321. The list contains the items that can be added as children of the root of the hierarchy. In this example, the list indicates the options to add a group or a data source. When the user selects the data source item, the user interface displays a list of data sources in the list 322. The data sources are a WMI data source, a registry data source, a metadata base data source, a file system data source, an active directory data source, and so on. When the user selects to add a group or a data source, the user interface adds that item as a child of the root.

Figure 4:
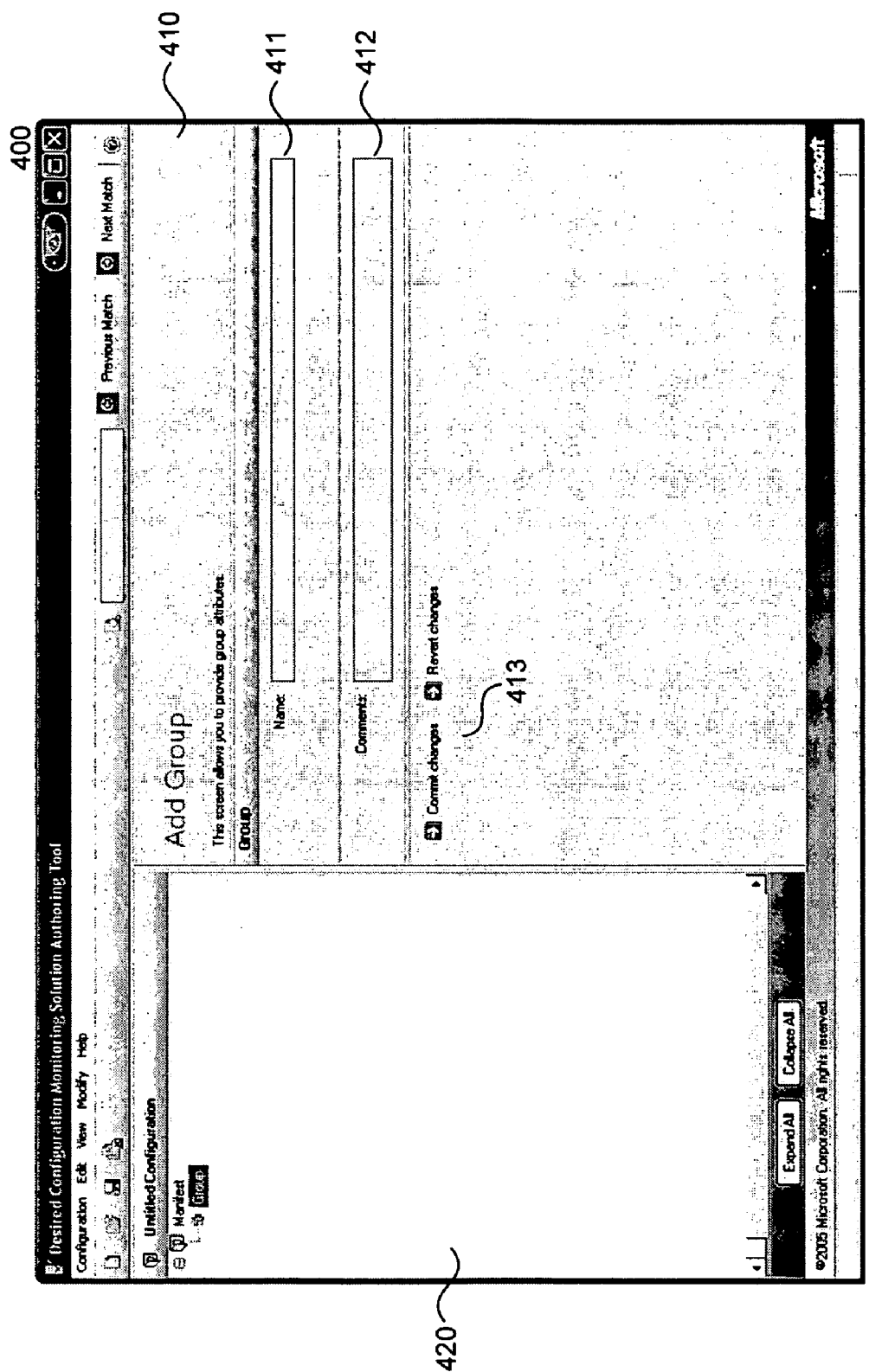
FIG. 4 illustrates a display page of the user interface after a user has selected to add a group as a child of the root in one embodiment.

FIG. 4 illustrates a display page of the user interface after a user has selected to add a group as a child of the root in one embodiment. Display page 400 includes a main panel 410 and a hierarchical display panel 420. The hierarchical display panel contains an indication that a group has been added as a child of the root. The main panel includes a name text box 411, a comments text box 412, and commit and revert changes buttons 413. The commit changes button is for saving the changes to the configuration settings hierarchy. When a user inputs a name for the group, the user interface displays the name of that group in the hierarchical display panel.

Figure 5:
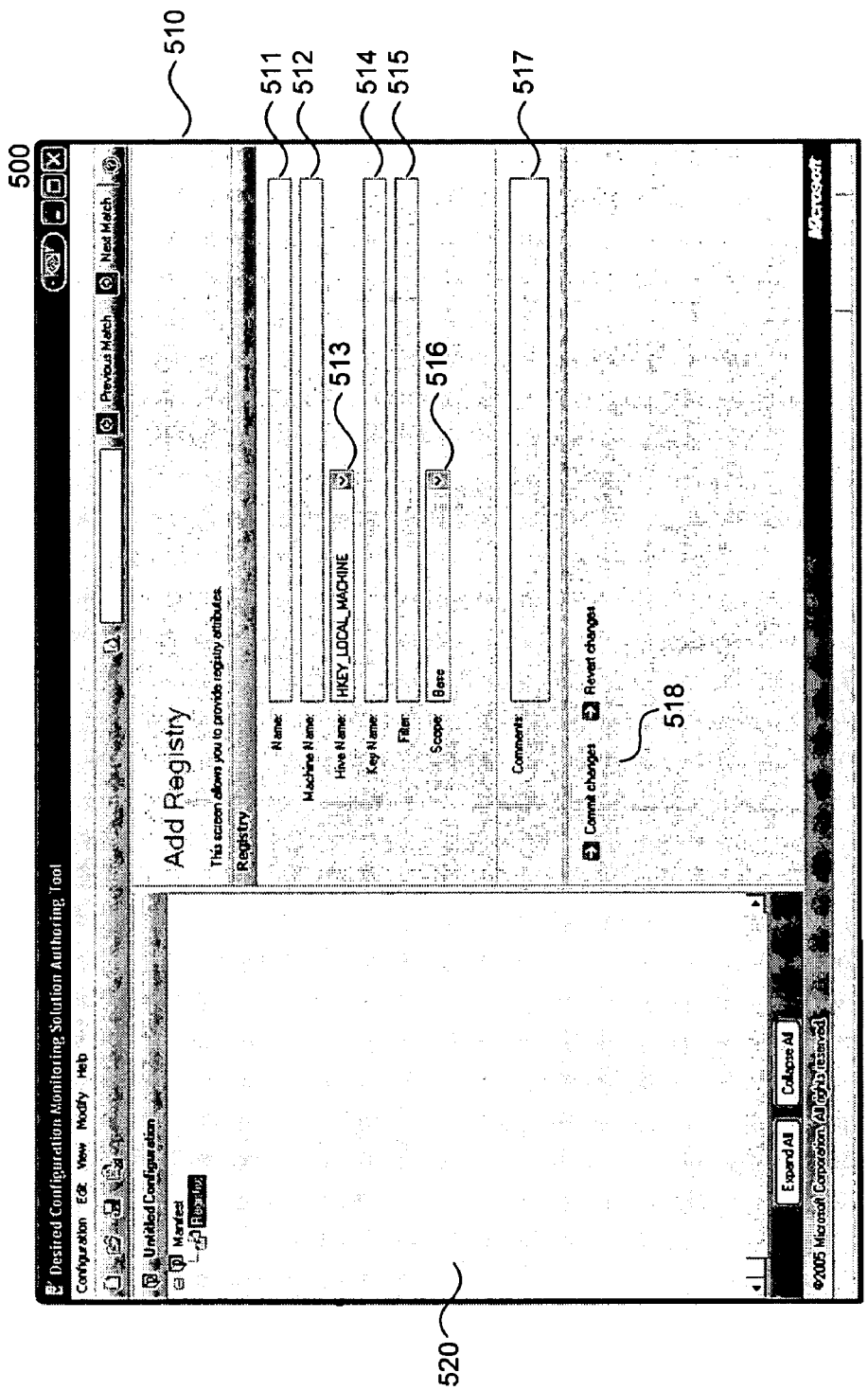
FIG. 5 illustrates a display page of the user interface after a user has selected to add a registry data source as a child of the root in one embodiment.

FIG. 5 illustrates a display page of the user interface after a user has selected to add a registry data source as a child of the root in one embodiment. Display page 500 includes a main panel 510 and a hierarchical display panel 520. The hierarchical display panel contains an indication that the registry data source has been added as a child of the root. The main panel includes a name, a name text box 511, a machine name text box 512, a registry hive name drop-down list 513, a registry key name text box 514, a filter text box 515, a scope drop-down list 516, and a comments text box 517, and a commit and revert changes buttons 518. The main panel displays data entry fields that are appropriate for the data source being added, which in this case is the registry data source. The user uses the comments and name text boxes to provide comments and a name for the data source. The machine name text box and the registry hive name drop-down list are used to specify the registry file and portion of the registry file. The registry key name text box is used to specify the key for the registry setting, and the filter text box is used to filter the settings. The user selects the commit changes button to save the changes to the DCM document.

Figure 6:
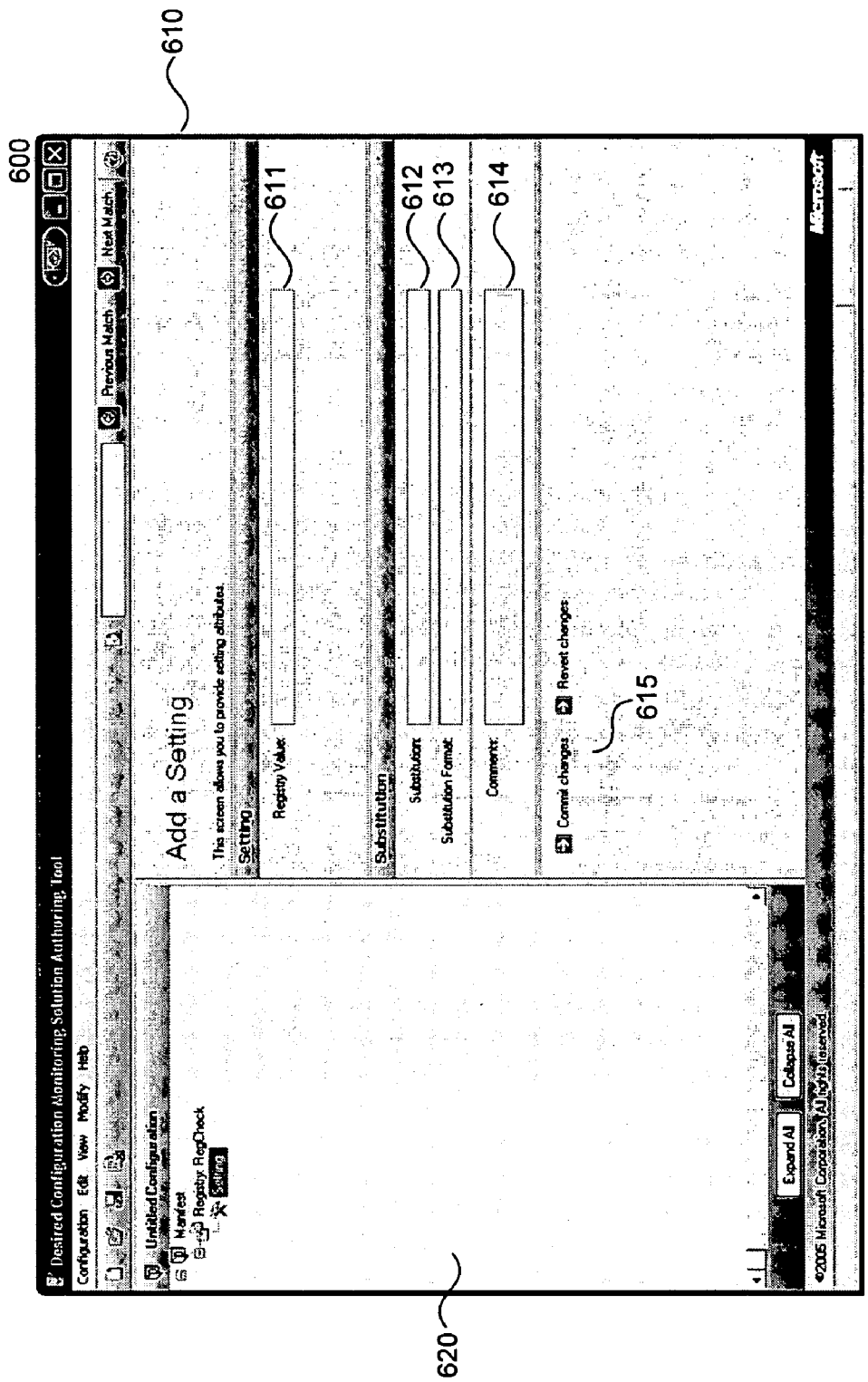
FIG. 6 illustrates a display page of the user interface after a user has indicated to add a setting to the registry data source of the hierarchy in one embodiment.

FIG. 6 illustrates a display page of the user interface after a user has indicated to add a setting to the registry data source of the hierarchy in one embodiment. Display page 600 includes a main panel 610 and a hierarchical display panel 620. The hierarchical display panel displays the hierarchy of the configuration settings that are currently defined. In this example, the hierarchical display panel displays the root, the registry data source, and a setting hierarchy. The main panel includes a registry value text box 611, a substitution text box 612, a substitution format text box 613, a comments text box 614, and a commit and revert changes buttons 615. A user enters the value for the registry key in the registry value text box. The substitution and substitution format text boxes are used to provide a substitute name for the content of the registry entry for the registry value. The substitute name may be used when specifying a nested data source. For example, if a substitute name is defined, that name can be used to specify a registry value for a registry key. As an example, one data source may provide an identifier for a network card. That identifier can be given a substitute name and used when specifying another data source (e.g., substitute name may be used to specify the value of a registry key).

Figure 7A:
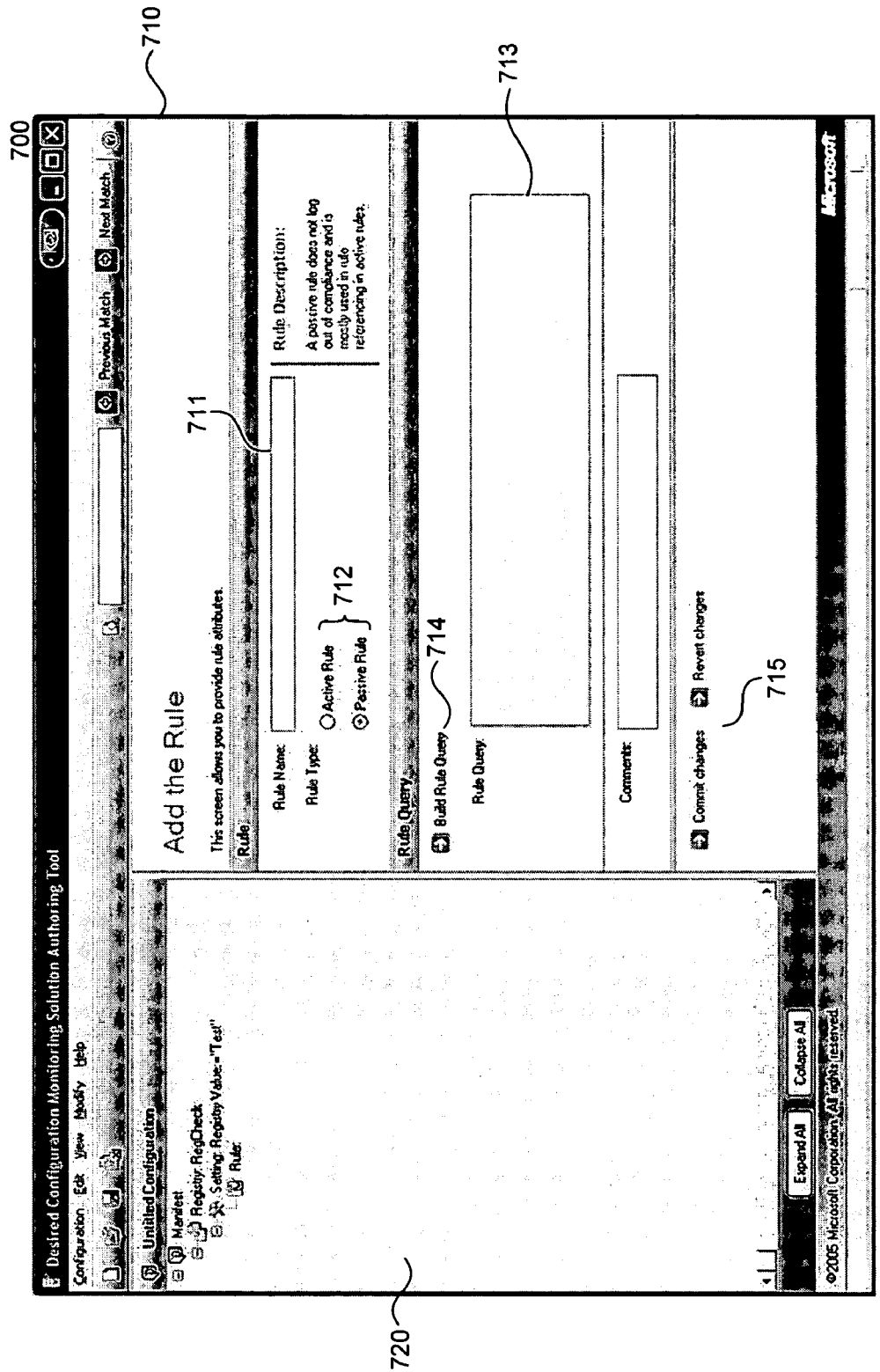
FIG. 7A illustrates a display page of the user interface after a user specifies to define a passive rule for a configuration setting in one embodiment.

FIG. 7A illustrates a display page of the user interface after a user specifies to define a passive rule for a configuration setting in one embodiment. Display page 700 includes a main panel 710 and a hierarchical display panel 720. The hierarchical display panel displays the configuration setting hierarchy that includes the root, a data source, a setting, and a rule. The main panel includes a rule name text box 711, rule type radio buttons 712, a rule query box 713, a build rule query button 714, and commit and revert changes buttons 715. The rule name text box allows a user to enter the name of the rule. The rule type radio buttons are used to indicate whether the rule currently being defined is active or passive. The rule query box contains the query or condition for the rule. The build rule query button is used to create or modify the query.

Figure 7B:
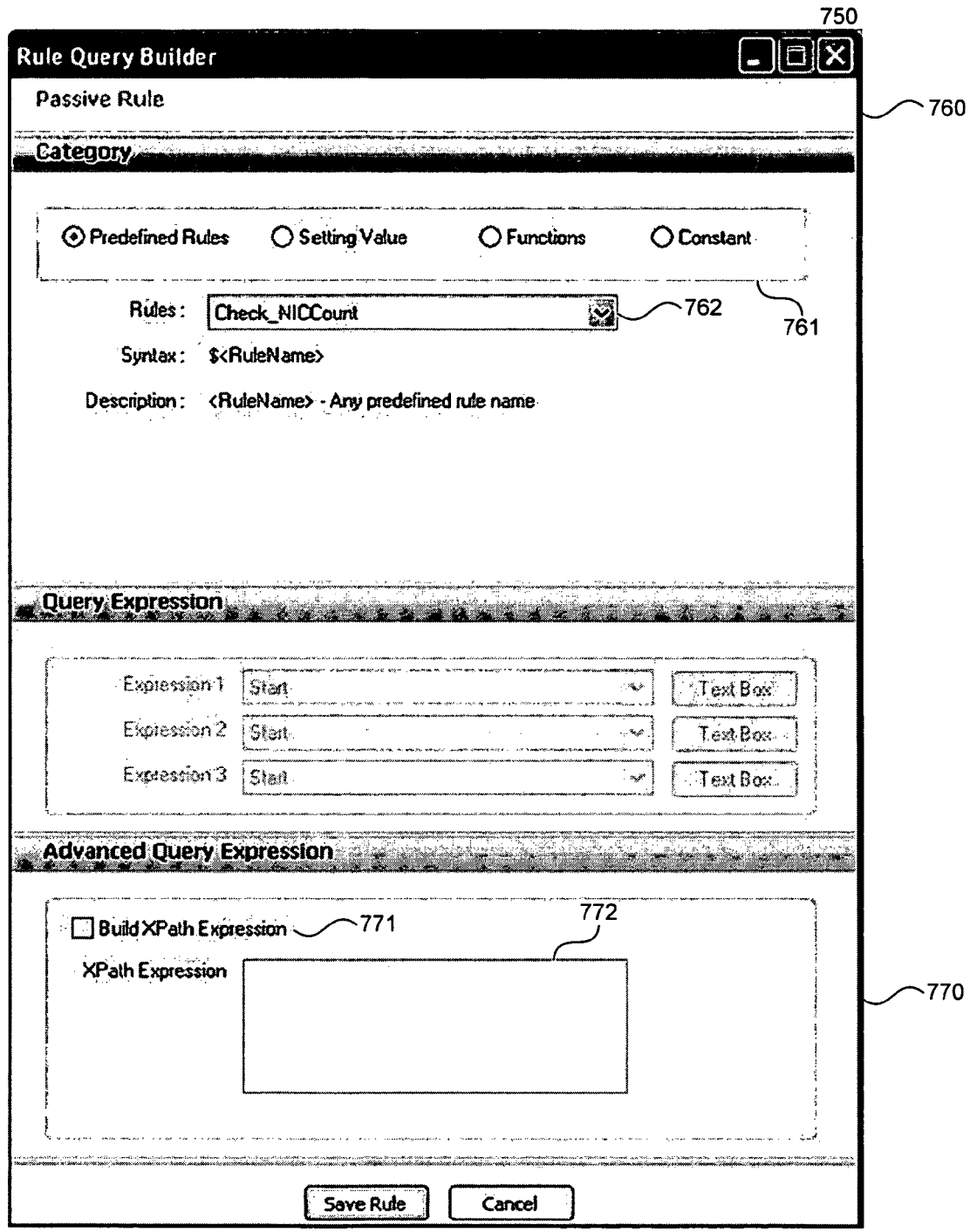
FIG. 7B illustrates a display page of the user interface after the user has selected to build a query for a passive rule in one embodiment.

FIG. 7B illustrates a display page of the user interface after the user has selected to build a query for a passive rule in one embodiment. Display page 750 includes a category area 760 and an advance query expression area 770. The category area includes radio button 761 for defining the category of the passive rule as predefined, setting value, functions, or constant. The setting value category is used to define a passive rule that includes the content of the registry entry. The functions category is used to define a passive rule that is based on a function. For example, the function "concat" may return the concatenation of strings. The constant category is used to define a passive rule with a constant value. The predefined rules category is used to define a passive rule that references another previously defined passive or passive rule. The predefined rules category may allow an indirection in rule naming. When a radio button is selected, the user interface displays the appropriate input boxes, such as rules drop-down list 762 for the selected category. The advance query expression area includes a build XPath expression check box 771 and XPath expression area. When the checkbox is checked, the user interface allows the user to enter an arbitrarily complex XPath expression for the passive rule. The monitoring system may perform no checking (e.g., syntax) on the XPath expression. The monitoring system stores a flag in the DCM document to indicate whether the XPath expression was entered using the XPath expression area. The monitoring system stores both active and passive rules as XPath expressions. The monitoring system may include a tokenizer to identify tokens of an XPath expression for active and passive rules and a parser to ensure that the syntax is correct.

Figure 8A:
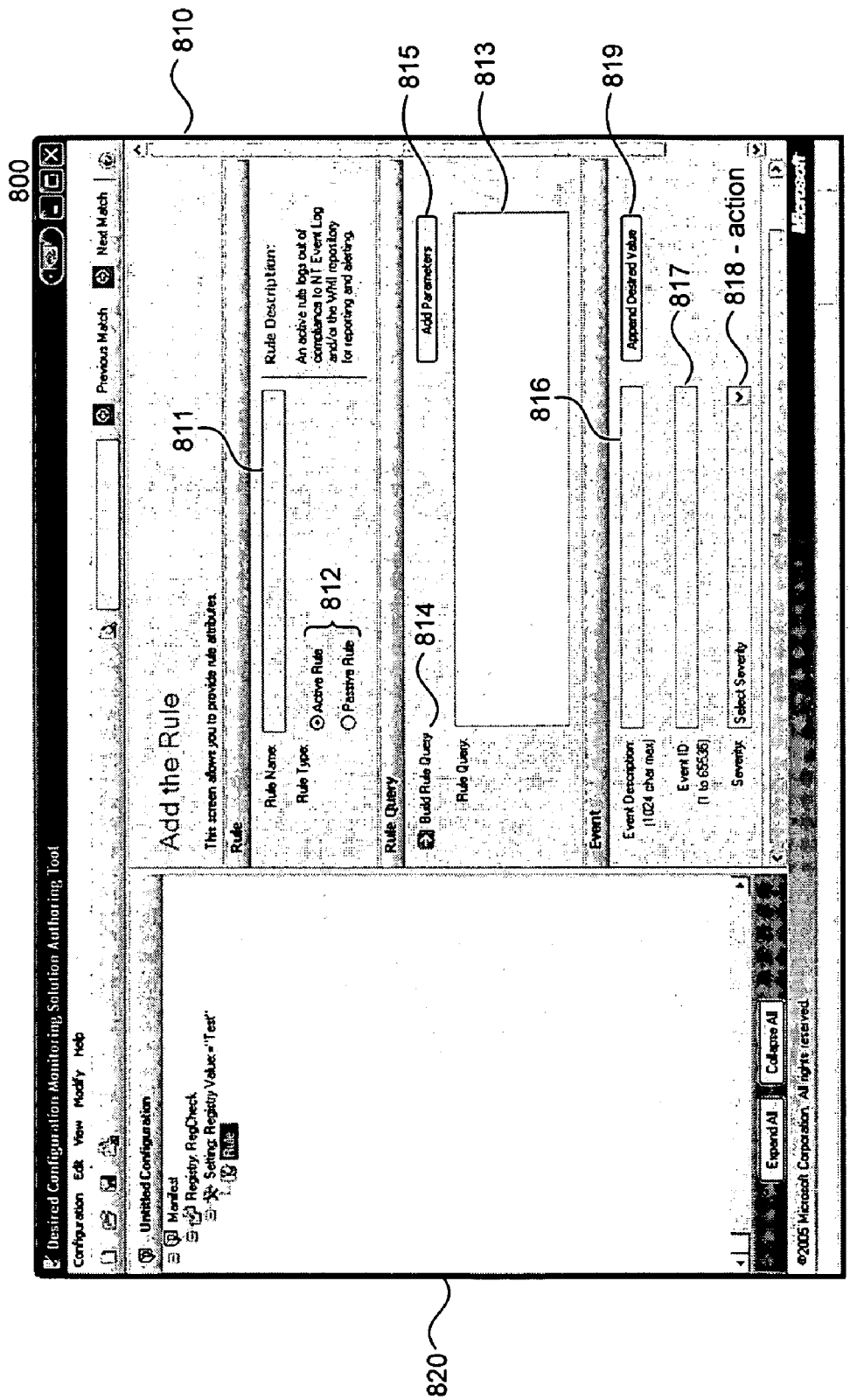
FIG. 8A illustrates a display page of the user interface after a user specifies to define an active rule for a configuration setting in one embodiment.

FIG. 8A illustrates a display page of the user interface after a user specifies to define an active rule for a configuration setting in one embodiment. Display page 800 includes a main panel 810 and a hierarchical display panel 820. The hierarchical display panel displays the configuration setting hierarchy that includes a root, a data source, a setting, and a rule. The main panel includes input areas 811-814 that correspond to input areas 711-714. In this example, the user has selected to create an active rule. In one embodiment, the rules are limited to an expression/operator/expression syntax unless the user selects to enter an arbitrarily complex XPath expression. The main panel also includes an event area that includes an event description text box 816, an event identifier text box 817, and a severity drop-down list 818. The event area allow a user to indicate a description to be included with an event along with an indication of the severity of the event. The description of the event may be included when the configuration setting is not in compliance. Also, the action taken by a computing device when a configuration setting is not in compliance may be based on the severity associated with the rule. For example, a severity of "critical" may result in an application being aborted, whereas a severity of "low" may simply result in the logging of an indication that the configuration setting is not in compliance. The display page may also include an action dialog to allow the user to define the actions to be performed when the event is generated. The append desired value button 819 is used to include the desired configuration value when the event is logged. The monitoring system may automatically derive the desired value from one of the expressions of the rule in the expression/operator/expression syntax. The add parameter button 815 allows a user to define parameters that can be included in the event description.

Figure 8B:
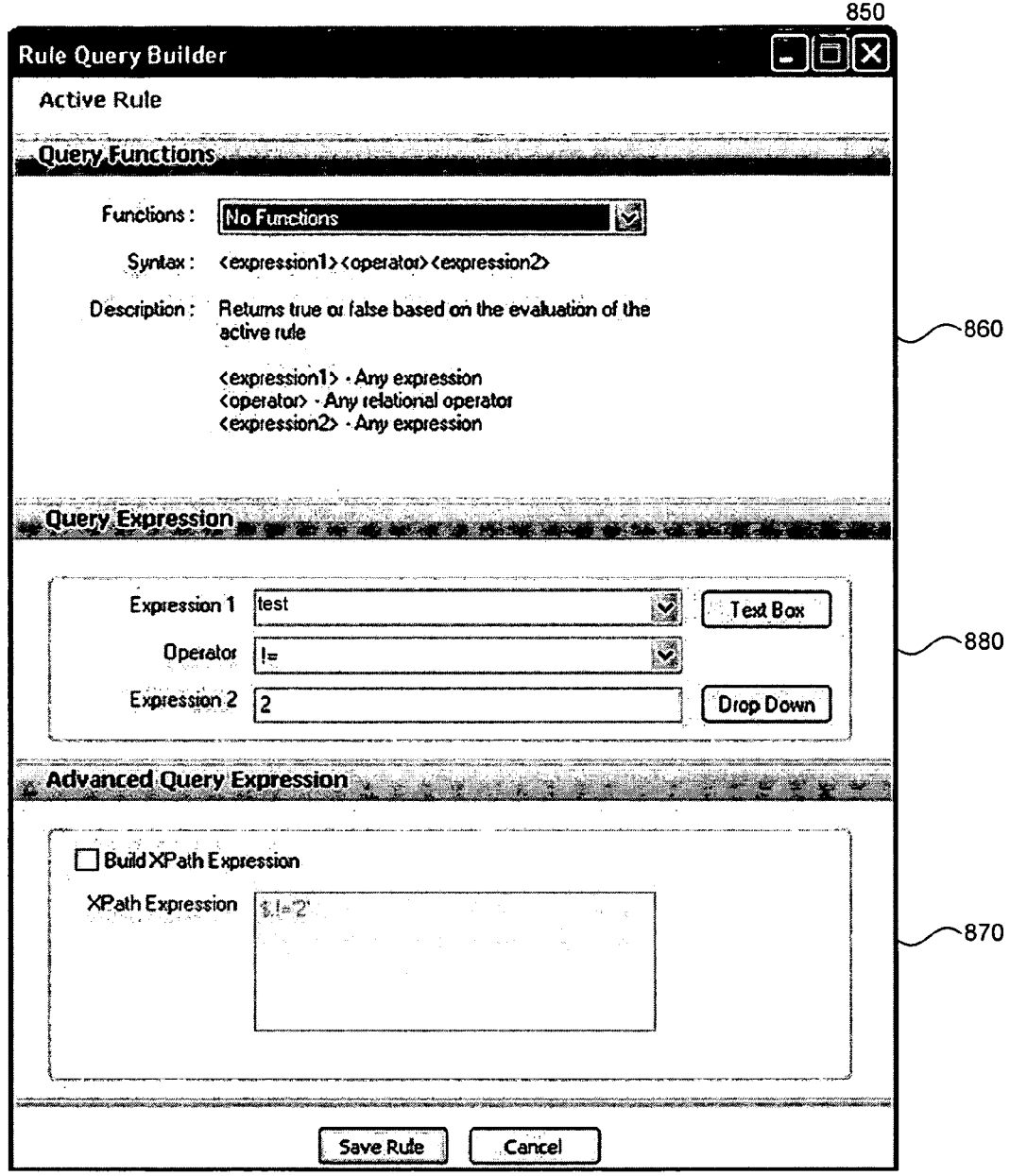
FIG. 8B illustrates a display page of the user interface after the user has selected the build a query for an active rule in an embodiment.

FIG. 8B illustrates a display page of the user interface after the user has selected to build a query for an active rule in an embodiment. Display page 850 includes a query functions area 860, an advanced query expression area 870, and a query expression area 880. The functions dropdown list allows the user to select whether the rule is to have the expression/operator/expression syntax (e.g., no function) or whether the rule is to provide the output of a predefined function (e.g., "starts with" or "contains"). The query expression area contains the fields appropriate to the selected function. In this example, since the selected function is "no function," the query expression area contains the expression 1, operator, and expression 2 fields. The expression fields can be a dropdown list or a text box. The dropdown list contains the registry key value (e.g., test) and the names of the rules. A text box allows the user to enter an arbitrary expression. The monitoring system includes a parser to ensure that the query is syntactically correct. The user can change a field from a dropdown list to a text box vice versa using the text box and dropdown buttons. The monitoring system stores the rule in the expression/operator/expression syntax into an XPath expression that is displayed in the advance query expression area. The advanced query expression area allows a user to specify the query as an arbitrarily complex XPath expression.

Figure 9:
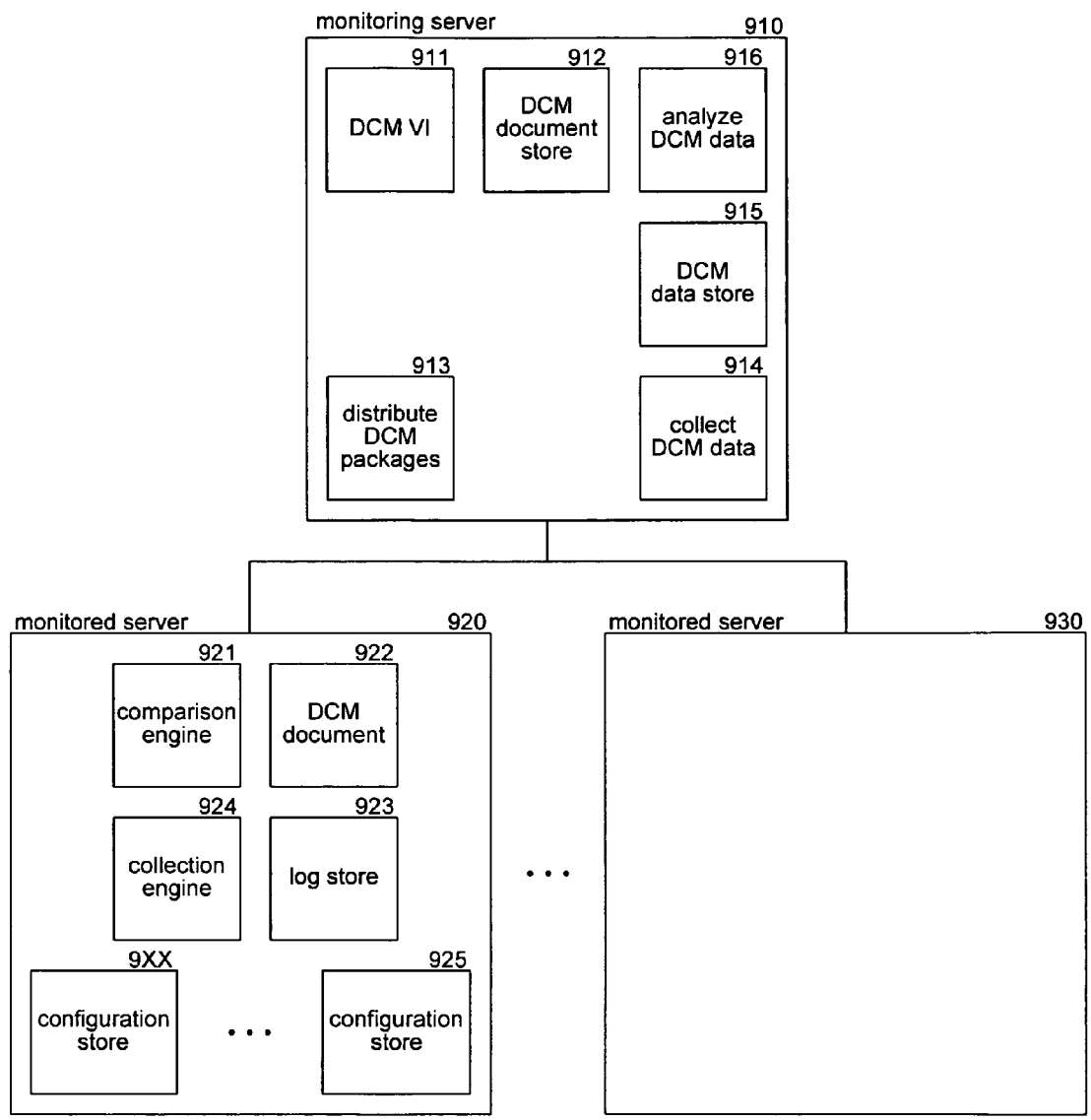
FIG. 9 is a block diagram that illustrates components of the monitoring system in one embodiment.

FIG. 9 is a block diagram that illustrates components of the monitoring system in one embodiment. The monitoring system includes server components that execute on a monitoring server 910 and client components that execute on a client or monitored server 920. The server components include a desired configuration monitor ("DCM") user interface component 911, a DCM document store 912, a distribute DCM packages component 913, a collect DCM data component 914, a DCM data store 915, and an analyze DCM data component 916. The DCM user interface component provides the user interface as described above. The DCM document store contains the DCM documents created using the DCM user interface component. The distribute DCM packages component creates DCM packages and distributes the DCM packages to the clients. The collect DCM data component collects data from the clients indicating configuration settings that are not in compliance and stores the data in the DCM data store. The analyze DCM data component provides various reports on the configuration settings that are not in compliance as indicated by the DCM data store. The client components include a comparison engine 921, a DCM document 922, a log store 923, and a collection engine 924. The comparison engine is run periodically to apply the rules of the DCM document to determine the configuration settings that are not in compliance. The comparison engine logs an indication of the configuration settings that are not in compliance in the log store. The collection engine periodically runs and provides the configuration settings that are not in compliance to the monitoring server. The configuration stores 925 represent the data source of the configuration settings. In one embodiment, the comparison engine may operate as described in U.S. patent application Ser. No. 11/064,687, entitled "System and Method for Retrieving and Analyzing Data from a Variety of Different Sources," filed on Feb. 24, 2005, which is hereby incorporated by reference.

The computing devices on which the monitoring system may be implemented may include a central processing unit, memory, input devices (e.g., keyboard and pointing devices), output devices (e.g., display devices), and storage devices (e.g., disk drives). The memory and storage devices are computer-readable media that may contain instructions that implement the monitoring system. In addition, the data structures and message structures may be stored or transmitted via a data transmission medium, such as a signal on a communications link. Various communications links may be used, such as the Internet, a local area network, a wide area network, or a point-to-point dial-up connection.

The monitoring system may be used to monitor configuration in various operating environments that include personal computers, server computers, hand-held or laptop devices, multiprocessor systems, microprocessor-based systems, programmable consumer electronics, network PCs, minicomputers, mainframe computers, distributed computing environments that include any of the above systems or devices, and the like. The monitoring system may also be used to monitor computing devices such as cell phones, personal digital assistants, consumer electronics, home automation devices, and so on. The monitoring system may be used to monitor various types of servers such as electronic mail servers, web servers, database servers, hosted application servers, telephony servers, instant messaging servers, SIP servers, proxy servers, and so on.

The monitoring system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments. For example, the user interface component may be executed on a computer system other than the monitoring server. In such a case, the DCM documents created by the user interface can be provided to the monitoring server for distribution.

Figure 10:
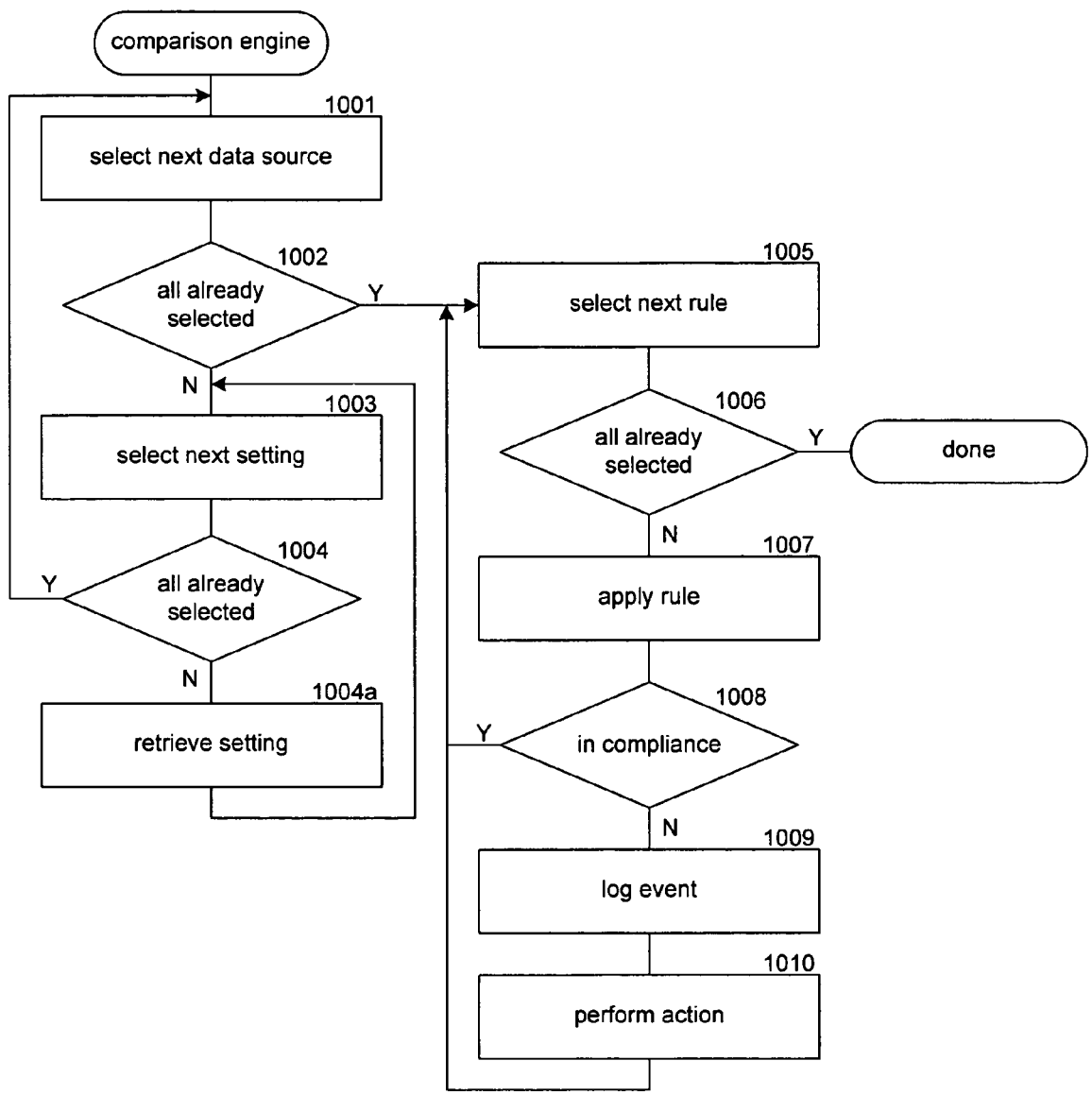
FIG. 10 is a flow diagram that illustrates the processing of the comparison engine component in one embodiment.

FIG. 10 is a flow diagram that illustrates the processing of the comparison engine in one embodiment. The comparison engine inputs a DCM document and applies of the rules in the DCM document to determine whether the configuration settings specified by the rules are in compliance. The engine loops selecting each data source of the DCM document and retrieving the settings and then loops applying the rules. In block 1001, the engine selects the next data source of the DCM document. In decision block 1002, if all the data sources have already been selected, then the engine continues at block 1005, else the engine continues at block 1003. In block 1003, the engine selects the next setting for the selected data source. In decision block 1004, if all the settings have already been selected, then the engine loops to block 1001 to select the next data source, else the engine continues at block 1004*a*. In block 1004*a*, the engine retrieves the value for the selected data source and the selected setting and loops to block 1003 to select the next setting. In block 1005, the engine selects the next rule for the selected setting. In decision block 1006, if all the rules have already been selected, then the engine completes, else the engine continues at block 1007. In block 1007, the engine applies the selected rule. In decision block 1008, if the setting is in compliance with the selected rule, then the engine loops to block 1005 to select the next rule, else the engine continues at block 1009. In block 1009, the engine logs the event. In block 1010, the engine performs the action associated with the selected rule and then loops to block 1005 to select the next rule.

Figure 11:
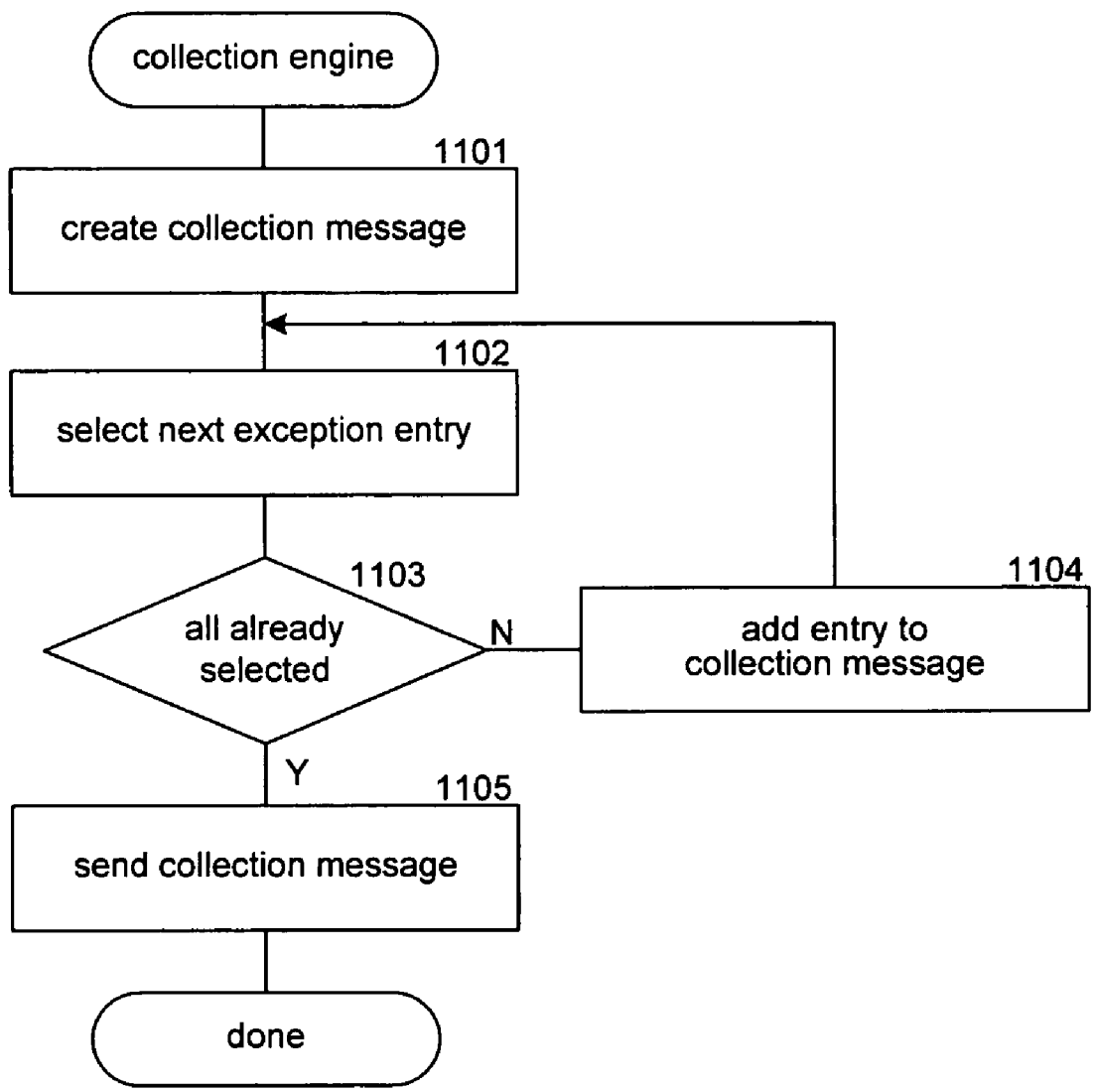
FIG. 11 is a flow diagram that illustrates the processing of the collection engine component in one embodiment.

FIG. 11 is a flow diagram that illustrates the processing of the collection engine component in one embodiment. The component may be invoked periodically by a computing device to collect the log of the configuration settings that are not in compliance to the monitoring server. In block 1101, the component creates a collection message. In block 1102, the component selects the next log entry. In decision block 1103, if all the log entries have already been selected, then the component continues at block 1105, else the component continues at block 1104. In block 1104, the component adds the selected entry to the collection message and loops to block 1102 to select the next log entry. In block 1105, the component sends the collection message to the monitoring server and then completes.

Figure 12:
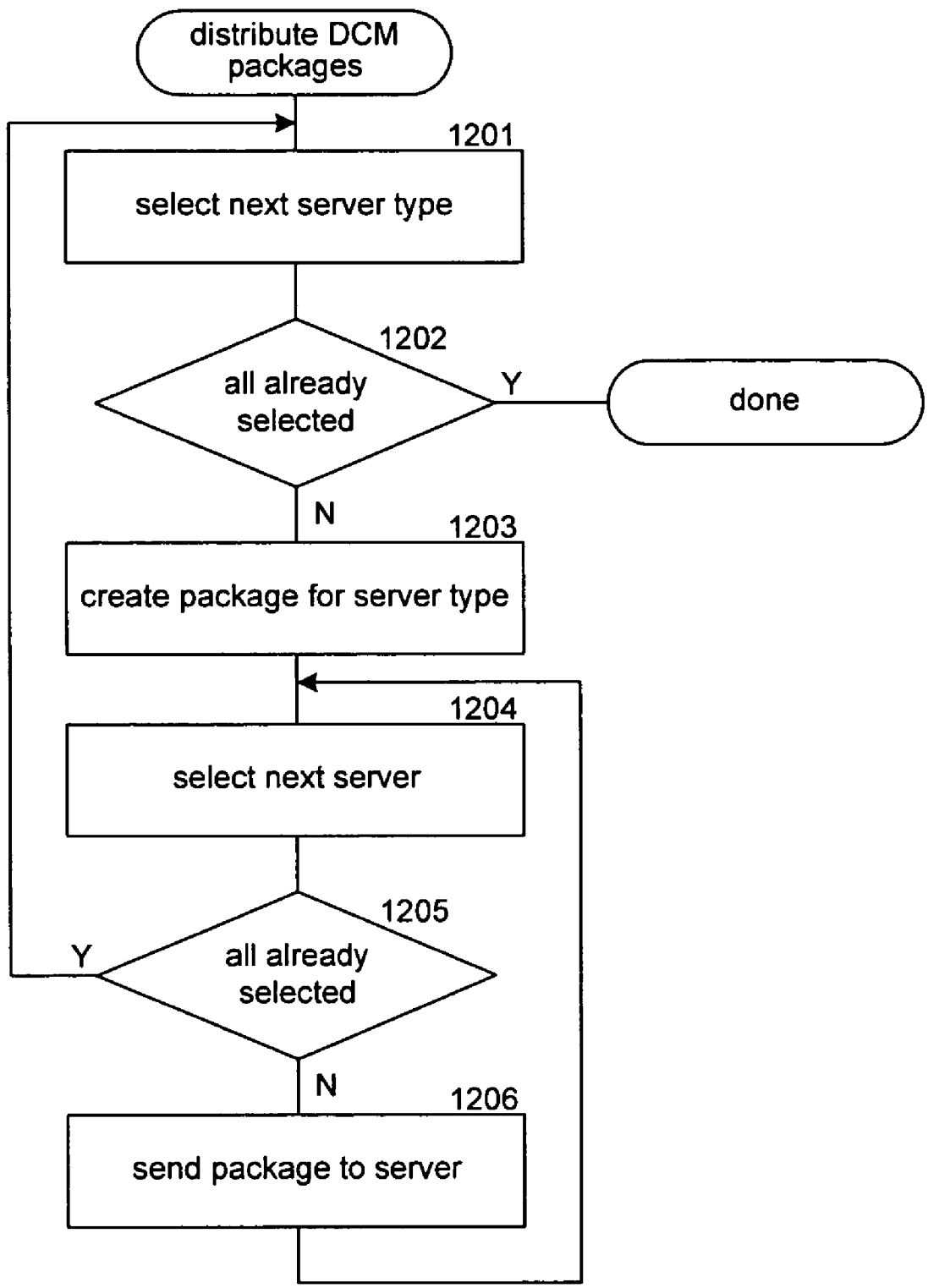
FIG. 12 is a flow diagram that illustrates the processing of the distribute DCM packages component in one embodiment.

FIG. 12 is a flow diagram that illustrates the processing of the distribute DCM packages component in one embodiment. The component may create a different DCM package for each type of client that the monitoring server monitors. For example, one DCM package may be created for electronic mail servers, and another DCM package may be created for web servers. In block 1201, the component selects the next server type. In decision block 1202, if all the server types have already been selected, then the component completes, else the component continues at block 1203. In block 1203, the component creates a package for the selected server type. The package may include the comparison engine, the DCM document for the file type, the reporting engine, and dynamic link libraries that implement the actions specified by the rules of the DCM document. In block 1204, the component selects the next server of the selected server type. In decision block 1205, if all the servers of the selected server type have already been selected, then the component loops to block 1201 to select the next server type, else the component continues at block 1206. In block 1206, the component sends the package to the selected server and then loops to block 1204 to select the next server of the selected server type.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

We claim:

1. A method for monitoring configuration information of computing devices that are servers, the method comprising:
   providing at a monitoring server a desired configuration monitor document that specifies configuration settings for applications that execute on the computing devices and associated rules for determining whether a configuration settings of the applications are in compliance, the rules being organized based on applications that use the configuration settings, at least one rule being an active rule that references a passive rule that specifies how to create a value that is used by the active rule, at least one rule specifying how to place a configuration setting that is not in compliance into compliance;

distributing from the monitoring server a copy of the desired configuration monitor document to each of the computing devices; and under control of each of the computing devices and for each application of the desired configuration monitor document, for each configuration setting for that application specified in the desired configuration monitor document, determining whether the rule associated with the configuration setting indicates whether the configuration setting is in compliance by when the rule specifies a passive rule, creating a value as specified by the passive rule and using the created value to determine whether the configuration setting is in compliance; and when it is determined that the configuration setting is not in compliance, logging that the configuration setting is not in compliance and when the rule specifies how to place a configuration setting that is not in compliance into compliance, automatically placing the configuration setting into compliance in accordance with the rule; and reporting to the monitoring server that the logged configuration settings are not in compliance and whether the configuration setting that was not in compliance has been corrected.

2. The method of claim 1 wherein the configuration settings are selected from a group consisting of registry, active directory, file, Windows management instrumentation configuration settings, and IIS metabase.

3. The method of claim 1 wherein a configuration setting of the desired monitor document has an associated action that is to be taken when the rule associated with the configuration setting is satisfied.

4. The method of claim 3 wherein the action is specified as executable code.

5. The method of claim 3 wherein the action is to shut down an application executing on the computing device.

6. A computer system at a monitoring server for monitoring the configuration settings of computing devices that are servers, the method comprising:

preparing at the monitoring server a desired configuration monitor document that specifies configuration settings and associated rules for determining whether a configuration setting is in compliance, the rules being organized based on applications that use the configuration settings, at least one rule specifying how to place a configuration setting that is not in compliance into compliance;

sending from the monitoring server to each of the computing devices a copy of the desired configuration monitor document so that a computing device that receives the desired configuration monitor document periodically applies the rules of the desired configuration monitor document to configuration settings of the application and places a configuration setting that is not in compliance into compliance as indicated by a rule;

receiving at the monitoring server from the computing devices reports indicating configuration settings of the computing device that are not in compliance as specified by the rules of the desired configuration monitor document and whether a rule that was not in compliance has been placed in compliance; and providing at the monitoring server reports for analyzing the configuration settings that are not in compliance.

7. The computer system of claim 6 wherein the sending includes sending to the computing devices a comparison engine for determining whether the rules of the desired configuration monitor document are satisfied.

8. The computer system of claim 6 wherein the sending including sending to the computing devices a collection engine for providing to the computer system the configuration settings that are not in compliance.

9. The computer system of claim 6 wherein the preparing includes providing a user interface through which a user can specify the configuration settings and rules.

10. The computer system of claim 6 wherein a rule of the desired configuration monitor is derived from configuration settings collected from computing devices.

11. The computer system of claim 6 wherein the desired configuration monitor document specifies groups of configuration settings.

12. The computer system of claim 11 wherein the configuration settings of a group are organized by data source.

13. A computer-readable storage medium containing instructions for controlling a computing device that is a server to monitor configuration information, comprising:

configuration settings and associated rules for determining whether a configuration setting is in compliance, the rules being organized into data sources of the configuration settings, at least one rule being an active rule that references a passive rule that specifies how to create a value that is used by the active rule;

a component that determines whether the rule associated with a configuration setting indicates whether the configuration setting is in compliance by when a rule specifies of passive rule, creating a value as specified by the passive rule and using the created value to determine whether the configuration setting is in compliance and that when the configuration setting is not in compliance, logs that the configuration setting is not in compliance; and a component that provides to a monitoring server the logged configuration settings that are not in compliance such that the monitoring server distributes configuration settings and rules to a plurality of computing devices that are servers and receives from the plurality of computing devices logged configuration settings that are not in compliance.

14. The computer-readable storage medium of claim 13 including a component to install on the computing device the component that determines and logs and the component that reports.

15. The computer-readable storage medium of claim 13 wherein a configuration setting has an associated action that is to be taken when the rule associated with the configuration setting is satisfied.

16. The computer-readable storage medium of claim 15 including a component that performs the associated action.

17. The computer-readable storage medium of claim 15 wherein the action is to put the non-compliant configuration setting into compliance.

* * * * *